United States Patent
Samenfink et al.

(10) Patent No.: US 6,513,486 B2
(45) Date of Patent: Feb. 4, 2003

(54) METHOD FOR IMPACT-REINFORCED MIXTURE FORMATION IN INTERNAL COMBUSTION ENGINES WITH DIRECT GASOLINE INJECTION

(75) Inventors: Wolfgang Samenfink, Karlsruhe (DE); Rainer Ortmann, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/871,980

(22) Filed: Jun. 4, 2001

(65) Prior Publication Data

US 2002/0043240 A1 Apr. 18, 2002

(30) Foreign Application Priority Data

Jun. 2, 2000 (DE) .......................................... 100 27 452

(51) Int. Cl.[7] ................................ F02B 17/00

(52) U.S. Cl. ..................... 123/295; 123/193.6; 123/298
(58) Field of Search ................................. 123/276, 279, 123/298, 305, 193.6, 295

(56) References Cited

U.S. PATENT DOCUMENTS

| 4,286,557 A | * | 9/1981 | Klomp ........................ 123/298 |
| 5,960,766 A | * | 10/1999 | Hellmich ................. 123/298 X |
| 6,095,114 A | * | 8/2000 | Horie et al. ................. 123/298 |
| 6,158,409 A | * | 12/2000 | Giillespie et al. ......... 123/193.6 |

* cited by examiner

Primary Examiner—Tony M. Argenbright
(74) Attorney, Agent, or Firm—Ronald E. Greigg

(57) ABSTRACT

A method for mixture formation in an internal combustion engine with direct gasoline injection, and an internal combustion engine with direct gasoline injection, are proposed in which the fuel is sprayed at the piston bottom in a thin coherent stream, deflected there, and then atomized.

10 Claims, 2 Drawing Sheets

METHOD FOR IMPACT-REINFORCED MIXTURE FORMATION IN INTERNAL COMBUSTION ENGINES WITH DIRECT GASOLINE INJECTION

BACKGROUND OF THE INVENTION

1. Field of the Invention

The invention relates to a method for generating a fuel-air mixture in internal combustion engines with direct gasoline injection, and to an internal combustion engine with direct gasoline injection.

2. Description of the Prior Art

In internal combustion engines with direct gasoline injection, in the partial-load range the goal is to form a cloud of an ignitable fuel-air mixture that fills part of the combustion chamber in the vicinity of the spark plug, while the remainder of the combustion chamber is as much as possible filled only with air. This decreases the specific fuel consumption in the partial-load range.

In the internal combustion engines known from the prior art (German Patent DE-PS 43 24 642 C2, German Published, Nonexamined Patent Application DE-OS 196 45 201 A1, or European Patent Disclosure EP 0 835 994 A2), the fuel on being injected is atomized in a conical pattern into many fine and superfine droplets of low impetus; that is, the mixture formation begins with the injection of the fuel into the combustion chamber. To reinforce the mixture formation, the walls of the combustion chamber or the air aspirated by the engine is used.

A disadvantage of the known internal combustion engines is that the conically atomized fuel strikes the cylinder wall or the piston bottom or face and forms a large-area wall film there, which in turn leads to a lagging course of combustion. The lagging course of combustion has disadvantages in terms of the specific fuel combustion and emissions.

OBJECT AND SUMMARY OF THE INVENTION

It is a primary object of the invention to furnish an improved method for generating a fuel-air mixture in internal combustion engines and to furnish an internal combustion engine with direct gasoline injection with improved partial-load performance as well as reduced specific fuel consumption and improved emission performance.

This object is attained according to the invention by a method for generating a fuel-air mixture in internal combustion engines with direct gasoline injection, in which a virtually cylindrical fuel stream into the combustion chamber in the direction of the piston bottom is injected;

the fuel stream at the piston bottom, forming a wall film is deflected;

the deflected fuel stream into fuel droplets is broken down; and the fuel is vaporized.

In the method of the invention, the fuel strikes a small area on the piston bottom at high impetus and is deflected by the piston bottom in the direction of the combustion chamber. The resultant wall film is thin and has a high flow velocity. After separating from the piston bottom, the wall film breaks down into fuel droplets of different size and speed and forms a cloud of fuel-air mixture. This cloud forms in the center of the combustion chamber and has no contact with the wall of the combustion chamber or with the piston bottom, and as a result no wall film of fuel forms, and the course of combustion is not lagging after the ignition of the mixture cloud.

Other advantages of this method are that it can be combined with wall-guided and air-guided combustion methods known per se, so that an especially favorable mixture formation ensues.

In a variant of the invention, the radial propagation of the fuel stream upon deflection is limited, so that the mixture cloud is prevented from striking the cylinder wall.

The radial propagation of the fuel stream upon deflection can be prevented by a concave indentation.

In a further feature of the invention, it is provided that the fuel-air mixture is ignited before reaching the wall of the cylinder head, thus reliably avoiding a wall film on the wall of the cylinder head.

The object stated above is also attained in accordance with the invention by an internal combustion engine with direct gasoline injection, having at least one cylinder, having a piston, and having a cylinder head, wherein an injection nozzle with an injection port is present in the cylinder head, wherein the fuel emerges from the injection port in the form of a virtually cylindrical stream, and wherein the longitudinal axis of the injection port extends parallel to the longitudinal axis of the cylinder, so that the fuel stream strikes the piston bottom at high velocity and with a small diameter and forms a small-area wall film that is deflected and atomized. In the atomization, fuel droplets of different size are formed; as a rule, the small droplets have a greater velocity than the somewhat larger droplets. The small droplets rapidly reduce their velocity, and the result is a mixture cloud with an adequately large volume in the middle of the combustion chamber. There is only slight deposition of fuel on the walls and the piston bottom.

Another advantage of the internal combustion engine of the invention is that it can be produced using production equipment for internal combustion engines of the prior art, since aside from the injection nozzle, the nozzle bore in the cylinder head, and the piston bottom, no modification of the engine is necessary.

In a further feature of the invention, the piston bottom has an indentation disposed concentrically to the longitudinal axis of the injection port, so that the fuel stream is deflected by virtually 180°, and the mixture cloud is created in the center of the combustion chamber.

In a further feature of the invention, the bottom face of the indentation is flat, so that minor deviations in terms of the direction or location of the fuel stream have only slight effects on the mixture formation.

In another feature of the invention, the indentation and the piston bottom are separated from one another by an encompassing protuberance, so that the fuel stream is deflected adequately well, and there is less weakening of the piston bottom from the indentation. The piston bottom in the region of the indentation can comprise a different material from the remainder of the piston bottom.

BRIEF DESCRIPTION OF THE DRAWINGS

The invention will be better understood and further objects and advantages thereof will become apparent from the detailed description contained herein below, taken in conjunction with the drawings, in which.

DESCRIPTION OF THE PREFERRED EMBODIMENTS

Figure 1:
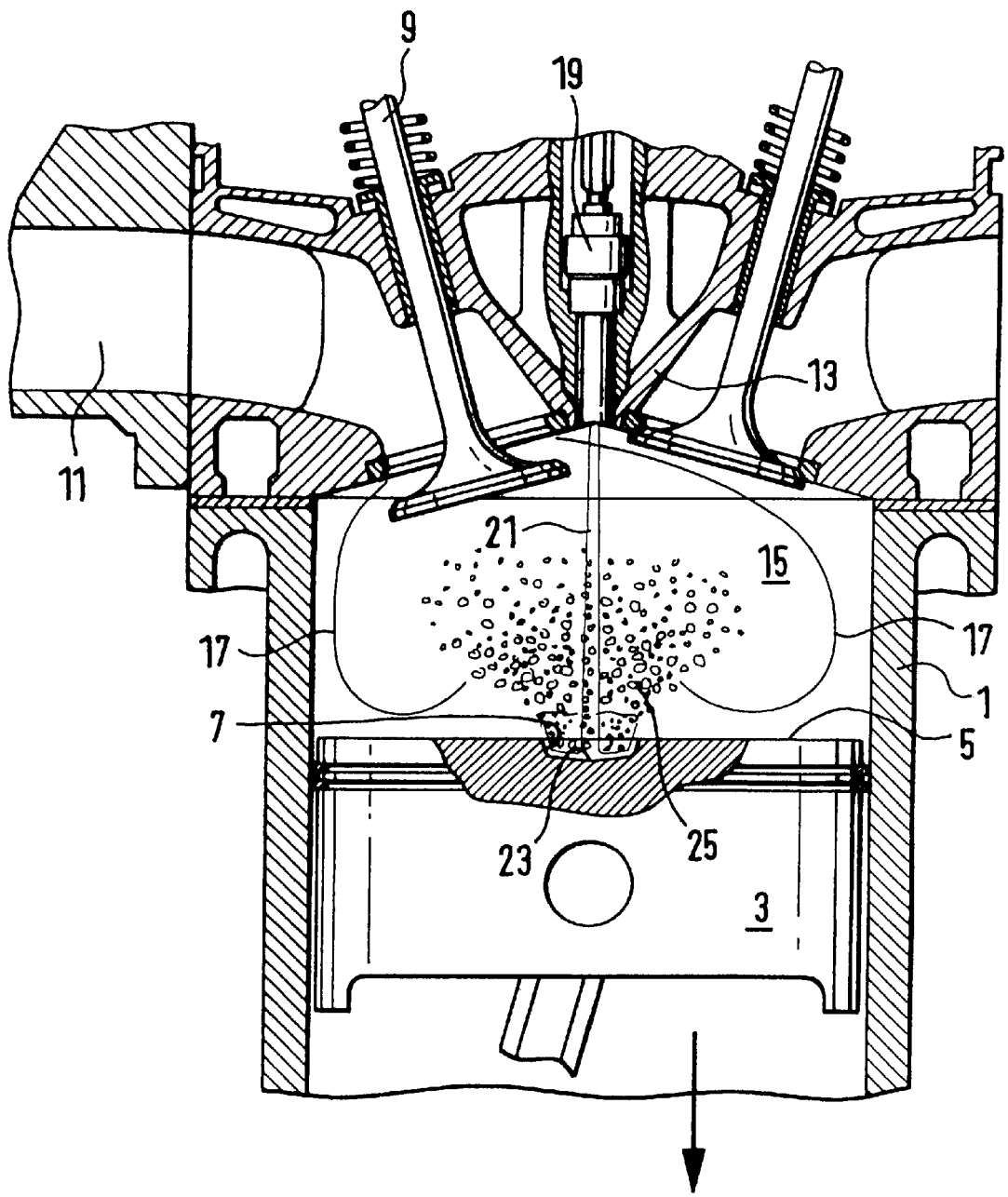
FIG. 1 shows an internal combustion engine according to the invention with homogeneous mixture formation.

In FIG. 1, an internal combustion engine of the invention is shown, with a cylinder 1 and with a piston 3 that has a piston bottom 5 and an indentation 7. The piston 3 is shown in a downward motion, represented by an arrow, and aspirates intake air through an opened inlet valve 9 from the inlet 11 into the combustion chamber 15, which is defined by the piston bottom 5, cylinder 1, and cylinder head 13. The air aspirated into the combustion chamber 15 through the inlet 11 is represented by the lines 17.

An injection nozzle 19 is disposed in the cylinder head 13. A stream 21 comprising fuel emerges from the injection nozzle 19. The thin and virtually cylindrical stream 21 strikes a bottom face 23 of the indentation 7 at high velocity and forms a wall film there, which is deflected in the indentation 7 and is atomized at the edge of the indentation 7 into many fuel droplets 25. The droplets 25 vaporize in the air in the combustion chamber 15 and form a homogeneous, ignitable mixture.

Because of the embodiment of an indentation 7 in the piston bottom 5, the stream 21 is deflected in such a way that at the outlet from the indentation 7, it has an annular cross section. This promotes both the atomization and the ensuing formation of an ignitable fuel-air mixture.

The mixture formation takes place during the intake stroke and the compression stroke, so that a homogeneous mixture in the combustion chamber 15 is established. This mode of operation is employed at high load and during the warmup phase of the engine.

Figure 2:
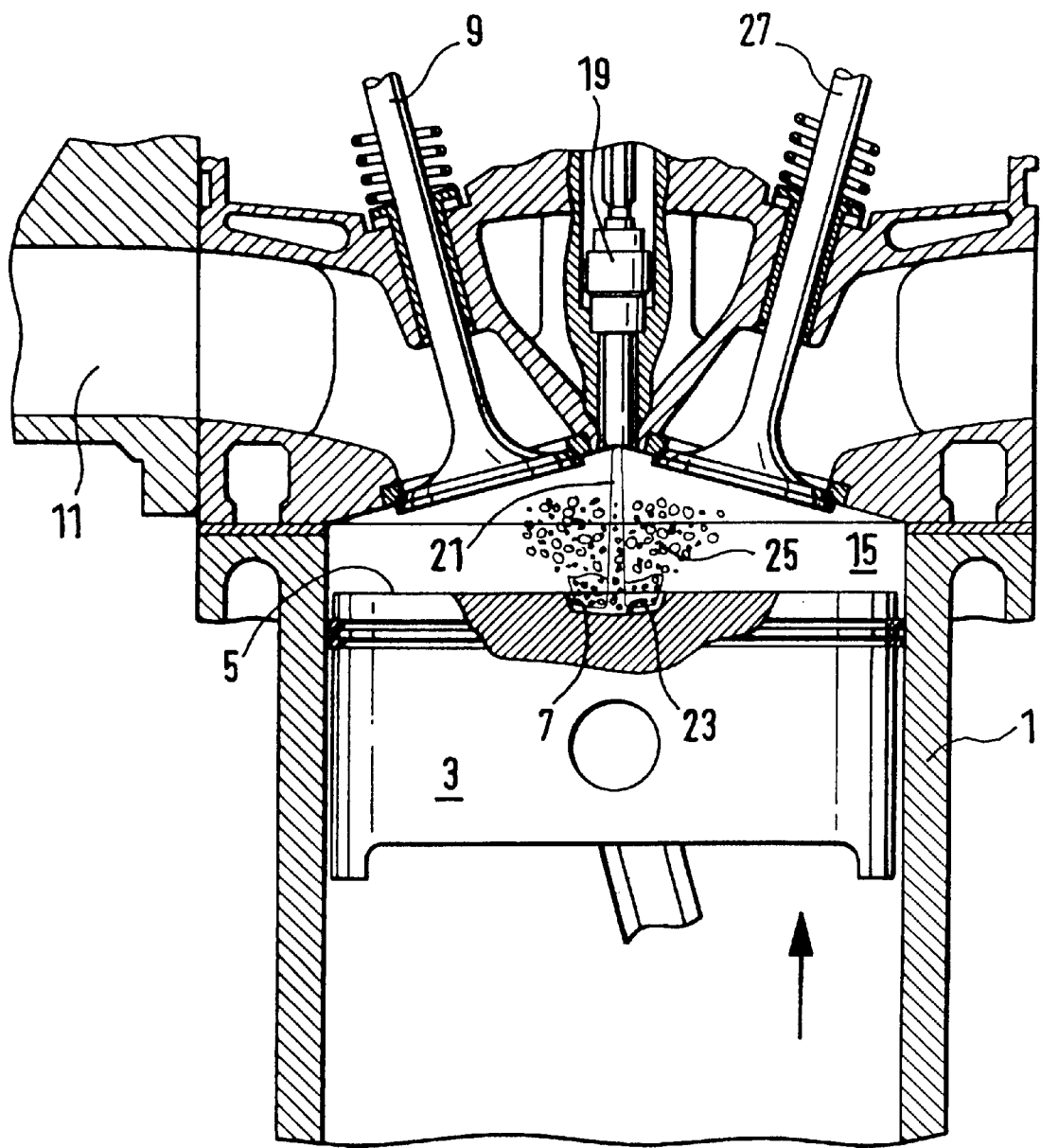
FIG. 2 shows an internal combustion engine according to the invention with stratified mixture formation.

FIG. 2 shows a further operating mode of an internal combustion engine of the invention. Identical components are identified by the same reference numerals as in FIG. 1. In this engine, the injection takes place during the compression stroke with the inlet valve 9 and outlet valve 27 closed. Because of the shortness of time between injection and ignition, the cloud of ignitable mixture develops only in the center of the combustion chamber 15 and does not touch the wall of the combustion chamber 15. The remainder of the combustion chamber 15 is filled with air. The mixture cloud is ignited by a spark plug, not shown in FIG. 1, before it reaches the wall of the cylinder 1 or of the cylinder head 13. In this mode of operation, a stratified combustion thus occurs. It is especially well suited for partial-load operation.

It is common to both modes of operation that no significant fuel film remains in the indentation 7 or strikes the bottom of the piston 3. This is partly due to the geometry of the indentation, to the velocity at which the fuel stream 21 strikes the piston bottom 5 or the indentation 7, and the temperature of the piston 3.

The foregoing relates to preferred exemplary embodiments of the invention, it being understood that other variants and embodiments thereof are possible within the spirit and scope of the invention, the latter being defined by the appended claims.

We claim:

1. A method for generating a fuel-air mixture in internal combustion engines with direct gasoline injection, the method comprising the steps of:

injecting a virtually cylindrical fuel stream (21) into the combustion chamber (15) in the direction of the piston bottom (5);

deflecting the fuel stream (21) at the piston bottom (5, 23), thereby forming a wall film;

breaking down the deflected fuel stream (21) into fuel droplets (25);

vaporizing the fuel; and igniting the fuel-air mixture before it reaches the wall of the cylinder head (13).

2. The method in accordance with claim 1, further comprising limiting the radial propagation of the fuel stream (21) upon deflection.

3. In an internal combustion engine with direct gasoline injection, having at least one cylinder (1), having a piston (3), and having a cylinder head (13), wherein an injection nozzle (19) with an injection port is present in the cylinder head (13), the improvement wherein said injection nozzle injects the fuel from the injection port in the form of a virtually cylindrical stream (21), and wherein said injection nozzle has an injection port having a longitudinal axis extending substantially parallel to the longitudinal axis of the cylinder (1), wherein an indentation (7) is formed in the bottom (5) of the piston (3), said indentation (7) being disposed concentrically to the longitudinal axis of said injection port, the bottom face of the indentation being flat.

4. The internal combustion engine in accordance with claim 3, wherein the bottom face (23) of the indentation (7) is smooth.

5. The internal combustion engine in accordance with claim 3, wherein said indentation (7) and the piston bottom (5) are separated from one another by an encompassing protuberance.

6. The internal combustion engine in accordance with claim 4, wherein said indentation (7) and the piston bottom (5) are separated from one another by an encompassing protuberance.

7. The internal combustion engine in accordance with claim 3, wherein the piston bottom (5) in the region of the indentation (7) comprises a different material from the remainder of the piston bottom (5).

8. The internal combustion engine in accordance with claim 4, wherein the piston bottom (5) in the region of the indentation (7) comprises a different material from the remainder of the piston bottom (5).

9. The internal combustion engine in accordance with claim 5, wherein the piston bottom (5) in the region of the indentation (7) comprises a different material from the remainder of the piston bottom (5).

10. The internal combustion engine in accordance with claim 6, wherein the piston bottom (5) in the region of the indentation (7) comprises a different material from the remainder of the piston bottom (5).

* * * * *